US011375003B2

(12) United States Patent
Agrawal

(10) Patent No.: US 11,375,003 B2
(45) Date of Patent: Jun. 28, 2022

(54) INTERNET CONTENT MARKING

(71) Applicant: Verizon Patent and Licensing Inc., Basking Ridge, NJ (US)

(72) Inventor: Rakesh Agrawal, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 367 days.

(21) Appl. No.: 14/153,696

(22) Filed: Jan. 13, 2014

(65) Prior Publication Data

US 2014/0129656 A1 May 8, 2014

Related U.S. Application Data

(63) Continuation of application No. 11/548,785, filed on Oct. 12, 2006, now Pat. No. 8,635,166.

(Continued)

(51) Int. Cl.
*G06F 16/48* (2019.01)
*G06F 16/955* (2019.01)
*G06F 16/78* (2019.01)
*G06F 16/332* (2019.01)
*G06F 16/953* (2019.01)

(Continued)

(52) U.S. Cl.
CPC ............ *H04L 67/10* (2013.01); *G06F 16/256* (2019.01); *G06F 16/3325* (2019.01); *G06F 16/48* (2019.01); *G06F 16/7867* (2019.01); *G06F 16/951* (2019.01); *G06F 16/953* (2019.01);

(Continued)

(58) Field of Classification Search
CPC ............ G06Q 30/0269; G06Q 30/0277; H04L 67/42; H04L 63/0428; H04L 9/3247; H04W 12/06; G06F 17/30867; G06F 16/95; G06F 16/9577; G06F 16/955; G06F 16/972; G06F 16/3325; G06F 16/7867; G06F 16/23; G06F 16/951; G06F 16/256; G06F 16/953
USPC ............ 707/769, 17.107; 709/203–206, 212, 709/219, 227, 231, 245, 230–235; 715/738, 739, 753, 758, 752, 755
See application file for complete search history.

(56) References Cited

U.S. PATENT DOCUMENTS 6,009,410 A * 12/1999 LeMole et al. ............ 705/14.54
6,735,586 B2 5/2004 Timmons et al.
(Continued)

OTHER PUBLICATIONS

Kosatka et al. "From Yellow Stickies to the World-Wide Web: The Evolution of Problem Tracking at the University of Houston" SIGUCCS'04, Oct. 10-13, 2004, Baltimore, Maryland, USA., Copyright 2004 ACM.

(Continued)

*Primary Examiner* — Tamara T Kyle
*Assistant Examiner* — Berhanu Mitiku

(57) ABSTRACT

Distributing content markings includes receiving, from a first entity, marking content corresponding to Internet content and author presentation instructions associated with the marking content. When a request to view the Internet or marking content is received from a second entity, the received author presentation instructions are used to determine whether the second entity is approved to view marking content associated with the requested Internet content. Dependent on whether the second entity is approved to view the marking content, presentation of the information associated with the marking content concurrently with the requested Internet content is enabled.

17 Claims, 10 Drawing Sheets

Related U.S. Application Data

(60) Provisional application No. 60/804,374, filed on Jun. 9, 2006.

(51) Int. Cl.
*G06F 16/951* (2019.01)
*G06F 16/25* (2019.01)
*H04L 67/10* (2022.01)
*G06F 21/30* (2013.01)

(52) U.S. Cl.
CPC .......... *G06F 16/9558* (2019.01); *G06F 21/30* (2013.01)

(56) References Cited

U.S. PATENT DOCUMENTS

| | | | |
|---|---|---|---|
| 7,373,313 B1 | 5/2008 | Kahle et al. | |
| 7,853,786 B1* | 12/2010 | Fultz | H04L 63/102 |
| | | | 726/28 |
| 7,873,708 B2* | 1/2011 | Durand | G06Q 30/02 |
| | | | 709/219 |
| 7,930,264 B2* | 4/2011 | Geppert | G06F 21/31 |
| | | | 706/47 |
| 2002/0021307 A1* | 2/2002 | Glenn et al. | 345/753 |
| 2002/0023010 A1 | 2/2002 | Rittmaster et al. | |
| 2002/0059364 A1* | 5/2002 | Coulthard | G06F 21/128 |
| | | | 709/203 |
| 2002/0071593 A1 | 6/2002 | Muratani | |
| 2003/0018896 A1 | 1/2003 | Aoshima et al. | |
| 2003/0090510 A1* | 5/2003 | Shuping | G06F 17/30873 |
| | | | 715/738 |
| 2004/0083391 A1* | 4/2004 | De Jong | G06F 21/10 |
| | | | 726/27 |
| 2004/0158746 A1* | 8/2004 | Hu | G06F 21/41 |
| | | | 726/8 |
| 2005/0091578 A1* | 4/2005 | Madan | G06F 17/241 |
| | | | 715/201 |
| 2005/0154905 A1 | 7/2005 | Kojima et al. | |
| 2005/0198031 A1 | 9/2005 | Pezaris et al. | |
| 2005/0223315 A1 | 10/2005 | Shimizu et al. | |
| 2006/0026692 A1* | 2/2006 | Lakhani | G06F 21/31 |
| | | | 726/28 |
| 2006/0167940 A1 | 7/2006 | Colton et al. | |
| 2006/0218227 A1* | 9/2006 | Spear | 709/203 |
| 2006/0271642 A1 | 11/2006 | Stavrakos et al. | |
| 2007/0094742 A1* | 4/2007 | Morita | H04N 1/00408 |
| | | | 726/26 |
| 2007/0203849 A1* | 8/2007 | Cameron | G06F 21/41 |
| | | | 705/67 |
| 2007/0294431 A1 | 12/2007 | Adelman et al. | |
| 2008/0126476 A1 | 5/2008 | Nicholas et al. | |
| 2008/0172747 A1 | 7/2008 | Hurtado et al. | |
| 2014/0129656 A1* | 5/2014 | Agrawal | G06F 21/30 |
| | | | 709/206 |

OTHER PUBLICATIONS

Churchill et al., "Anchored Conversations: Chatting in the Context of a Document", CHI '2000 The Hague, Amsterdam, Copyright ACM 2000.

Mohan et al., "Adapting Multimedia Internet Content for Universal Access" IBM T.J. Watson Research Center, PO Box 704, Yorktown Heights, NY 10598.

Smale et al., "Broadcasting Information via Display Names in Instant Messaging", Group '05, Nov. 6-9, 2005, Sanibel Island, Florida, USA., Copyright 2005 ACM.

* cited by examiner

500

Sticky Settings

General

505 When creating new stickies, make them: What is this?
○ Private Stickies (viewable only by you.)
● Buddy Stickies (viewable by people on your buddy list.)
○ Public Stickies (viewable by everyone.)

510 Display all:
☒ Private Stickies
☐ Buddy Stickies
☐ Public Stickies

515 Display up to [10] stickies on a page at a time. Your stickies will always be displayed, and do not count towards this total.

520 Automatically check for stickies when entering a page:
● Always
○ Never

525 Automatically suggest tags for stickies: What is this?
● Always
○ Never

Appearance

530 ☐ Use current AIM wallpaper on all stickies. 

535 ☐ Display my buddies wallpaper on their stickies (when they have it turned on.)

Fig. 5A

INTERNET CONTENT MARKING

CROSS-REFERENCE

This application is a continuation of U.S. patent application Ser. No. 11/548,785, filed Oct. 12, 2006 (now allowed), which claims priority from U.S. Provisional Application No. 60/804,374, filed Jun. 9, 2006. The disclosures of the above-referenced applications are all expressly incorporated herein by reference.

TECHNICAL FIELD

This invention relates to accessing Internet content.

BACKGROUND

Individuals may navigate websites and other Internet content that include vast amounts of information.

SUMMARY

In one general aspect, distributing content markings includes receiving, from a first entity, marking content corresponding to Internet content and author presentation instructions associated with the marking content. A request to view the Internet or marking content is received, from a second entity, and the received author presentation instructions are used to determine whether the second entity is approved to view marking content associated with the requested Internet content. If the second entity is approved to view the marking content, presentation of the information associated with the marking content concurrently with the requested Internet content is enabled.

Implementations may include one or more additional features. For instance, user presentation instructions may be received from the second entity, and may include instructions to approve viewing of information associated with the marking content based on the author of the marking content, to approve viewing of information associated with the marking content based on a category of content of the marking content, or to approve viewing of information associated with the marking content based on ratings of the marking content provided by users viewing the marking content. Determining whether the second entity is approved may include using the user presentation instructions.

Marking content may include information associated with image, video, or audio data and corresponding presentations instructions. Tags that are associated with the marking content or the Internet content also may be received. Instructions to approve viewing of information associated with the marking content based on the identity of the second user may be received, and may include instructions to approve viewing when the second entity is on a predetermined list of users.

Also, instructions to enable presentation of the marking content authored by digital entities automatically may be received. These instructions may include instructions to automatically determine content within the marking content by analyzing the Internet content. Instructions to automatically determine content may be configured to present content that is added to the Internet content, after the author presentation instructions from the first entity are received, without further input from the first entity. Content within the marking content may be determined by analyzing features of the Internet content other than text. Marking content and author presentation instructions may include instructions to associate the marking content with one or more websites, such as websites that include one or more of keywords, a category of content, a domain name, or an association with a user. The instructions may be configured to associate the content marking with a website created after the author presentation instructions from the first entity are received without further input from the first entity.

Tags may be automatically generated based on received marking content or the Internet content. The first entity and the second entity may be the same, and the author presentation instructions may indicate when and how to approve viewing of the marking content such that only the first entity will be approved to view the marking content. Enabling presentation of the information associated with the marking content concurrently with the requested Internet content may include presenting the marking content such that the marking content may be moved to different positions with respect to the Internet content. Enabling presentation of the information associated with the marking content may include presenting the marking content.

In another general aspect, receiving marking content includes sending, to a first entity, a request to view Internet content and sending, to a second entity, a request to view marking content associated with the Internet content and including an identification of the requesting entity and the Internet content. Marking content information is received from the second entity dependent on whether the second entity determines, based on the identification of the requesting entity, the identification of the requested Internet content, and previously stored marking content instructions, whether marking content is appropriate for the user. Presentation of the marking content concurrently with the Internet content is enabled.

Implementations may include one or more additional features. For instance, sending a request to a first entity may include sending a request to an Internet service provider server configured to receive webpage requests, and sending a request to a second entity may include sending a request to a different server within the Internet service provider configured to receive marking content requests. Sending a request to the different server within the Internet service provider may include sending, from the user to the second entity, the request to view marking content associated with the Internet content, and also may include sending, from the first entity to the second entity, the request to view marking content associated with the Internet content. Further, sending a request to a first entity may include sending a request to an Internet service provider server configured to receive webpage requests, and sending a request to a second entity may include sending a request to a third party configured to receive marking content requests independent of webpage requests. Enabling presentation of the marking content concurrent with the Internet content may include rendering the marking content superimposed over the Internet content.

The details of one or more implementations are set forth below. Other features will be apparent from the description, including the drawings, and from the claims.

DESCRIPTION OF DRAWINGS

FIGS. 5A and 5B illustrate exemplary graphical user interfaces for editing Internet content settings.

Like reference symbols in the various drawings indicate like elements.

DETAILED DESCRIPTION

A user of an online community may leave Internet content markings on Internet content. For example, a user of a personal communication program (e.g., AOL Instant Messenger) may generate digital "stickies" which are associated with a website and the authoring user's identity. The author of the stickies may assign characteristics indicating availability of the stickies to other users, such as presentation instructions dictating which users are authorized for viewing. When authorized, users may decide to opt-in to view stickies. The stickies may include various features, such as, for example, information on the author (e.g., online presence) or keywords.

Stickies may be automatically generated by a digital entity (e.g., a program). Automatic generation may be triggered by user activity, Internet content, or a combination thereof. For example, a user may opt-in to view stickies by a digital entity entitled "Mr. Automap." When the user navigates to a webpage with an address listed, a sticky may be automatically generated by "Mr. Automap" with an interactive mini-map superimposed over the address. Alternatively, the sticky with the mini-map may be generated when a user pauses a cursor over the address.

Figure 1:
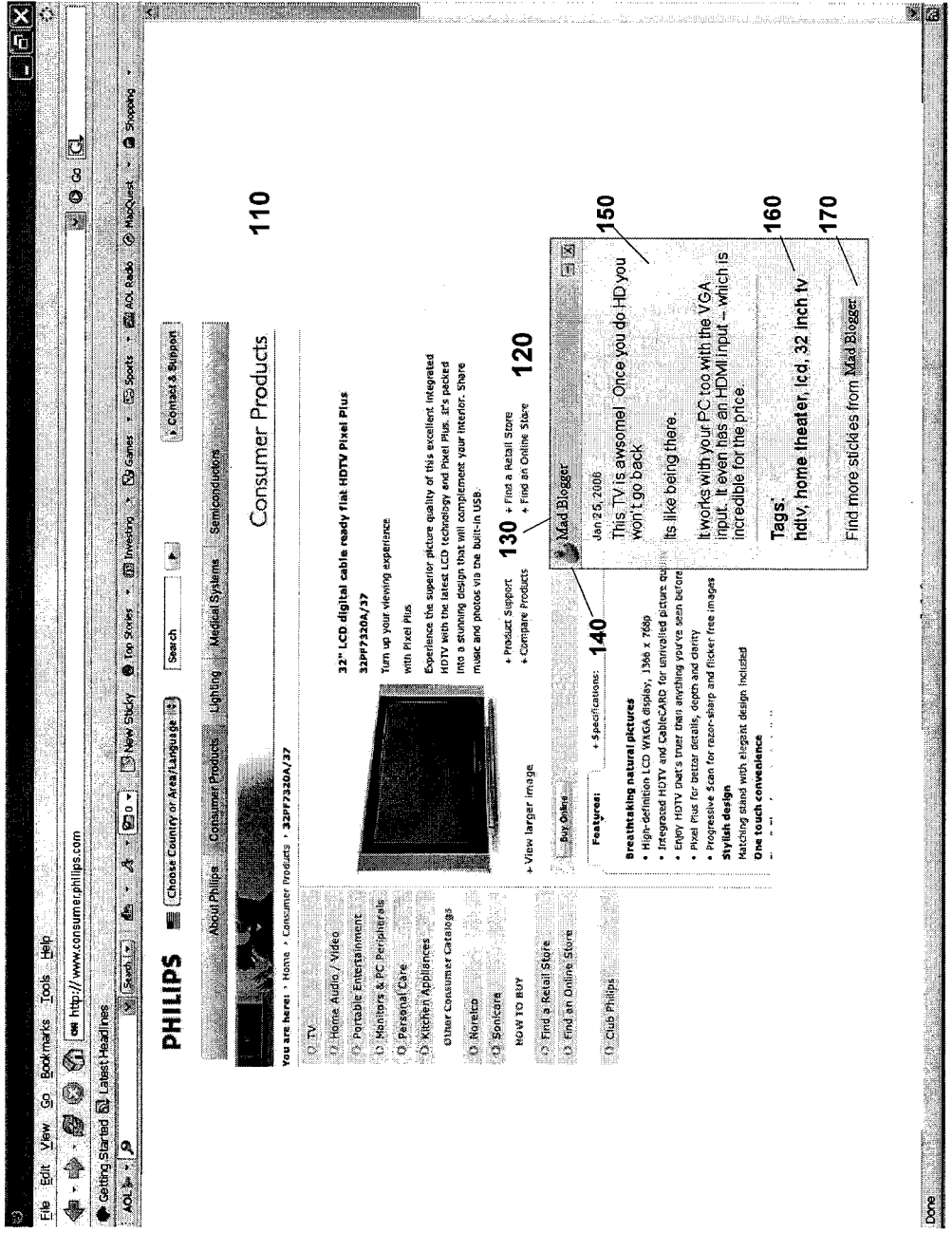
FIGS. 1. and 2 illustrate exemplary graphical user interfaces including Internet content markings.

Referring to FIG. 1, a graphical user interface (GUI) 100 includes a webpage 110 and an Internet content marking 120. In the GUI 100, a user authorized to view Internet content markings associated with "Mad Blogger" has opted-in and accessed a webpage 110 that includes an Internet content marking 120. The Internet content marking, or, in this case, "sticky" 120, is automatically rendered superimposed over the webpage 110. A user may manipulate the sticky 120 such that it may be moved, minimized, or closed.

The sticky 120 includes an author identifier 130, an online presence identifier 140, a body 150, tags 160, and an author reference 170. The author identifier 130 includes the author's name or association. The author identifier 130 also include an online presence identifier 140 (e.g., "away" or "idle"). In various implementations, the sticky 120 may be interactive such that when a user clicks on the author's presence identifier 140, an appropriate communication may be presented (e.g., an instant message is presented when the author is present, or an email is presented when the author is offline) to initiate communication with the author.

A body 150 may include text, media, or other interactive content placed in the sticky by the author. For example, a body 150 may include a text message or hyperlink.

Tags 160 are keywords that may be used to categorize or search the stickies. Tags 160 may be manually typed in by the author, or selected based on the content of the body 150, or by the content of the website associated with the sticky.

The author reference 170 includes a link or excerpt of information concerning the author or other stickies associated with the author. For example, the author reference 170 may be a link to a listing of other stickies presented by the author, or may be a link to an author's homepage, blog, online profile, or other websites or content.

The previous description is an example implementation of a GUI for distributing Internet content markings. Other implementations may be organized differently and may include different features. For example, in one implementation, the sticky 120 may include a comments section, in which viewers may leave messages for the author or other viewers that may be placed on the sticky 120.

Figure 2:
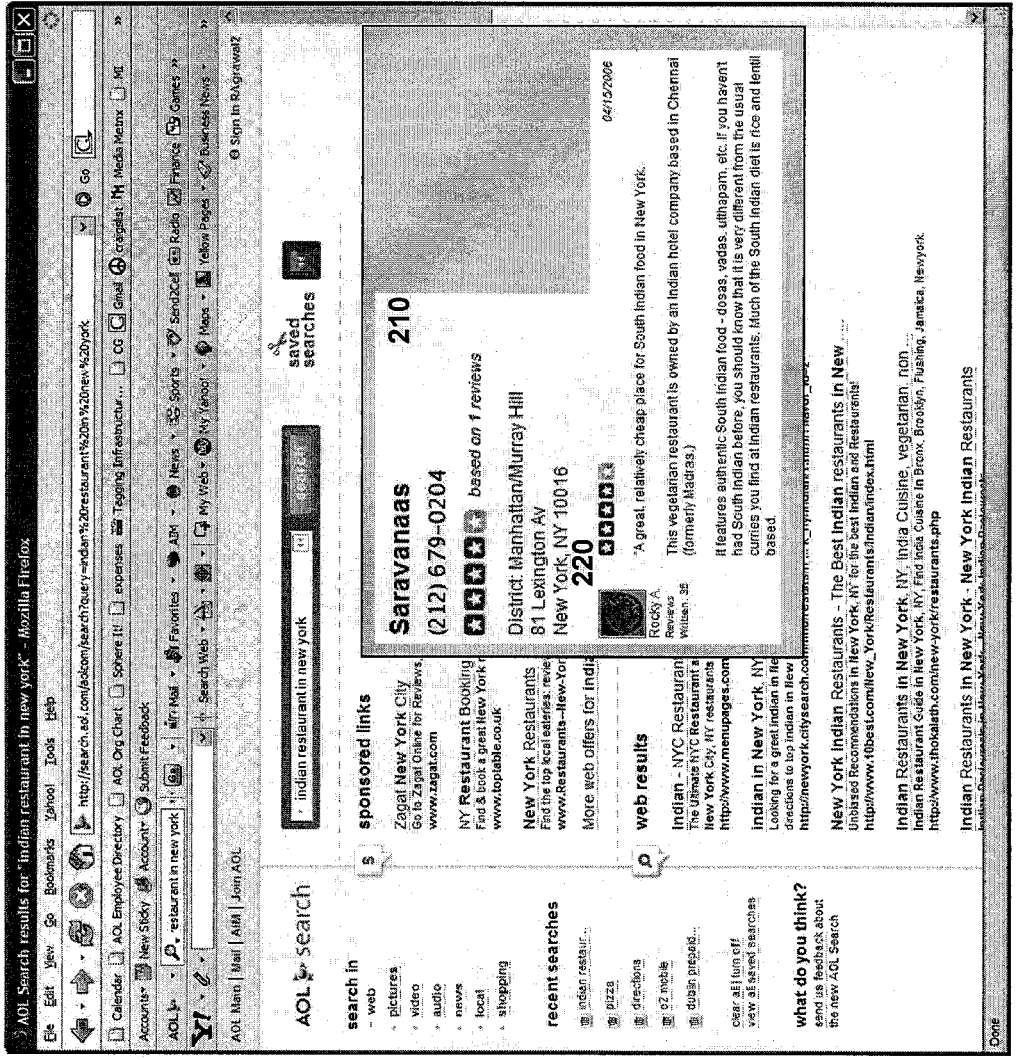

Referring to FIG. 2, a GUI 200 includes a website and an Internet content marking 210. In the GUI 200, a user has opted-in to view related stickies by the user Rocky A. Stickies may be related to content directly or indirectly. A user creating a sticky may directly relate the sticky to Internet content, such as a website, by creating the sticky as associated with the website. The sticky may be indirectly related to a website by similarity in content of the sticky body and the website, by appearance of keywords in the website, by use of tags, or by sticky categorization. By enabling a sticky to be indirectly related to a website, an author may create the sticky directed to a single website, and, without further action by the author, the sticky may be presented along with websites created after the sticky was created.

In GUI 200, an author has presented a sticky 210 that includes a review of Saravanaas, an Indian restaurant. The sticky has been indirectly related to websites with content including Indian restaurants. The user has opted-in to view related stickies by user Rocky A, and searched for "Indian restaurants in New York." Since the website includes a similarity in content to the sticky 210 presented by the user, the sticky 210 is presented along with the website. For the sticky 210 to be related, the actual text of the sticky 210 and the website content need not match.

The sticky 210 also includes a ratings feature 220 that enables opted-in users to provide feedback on the sticky itself. In one implementation, any user who has opted-in may rate the sticky from 1 to 5 stars. The average rating is posted on the front of the sticky. Optionally, users providing ratings may post a comment which may also be presented with the sticky 210.

The previous description is an example implementation of a GUI for relating Internet content markings with Internet content. Other implementations may be organized differently and may include different features. For example, in one implementation, the sticky 210 may include a related website list function, that enables users to view a list of all websites that are related directly, indirectly, or both, to the sticky.

Figure 3A:
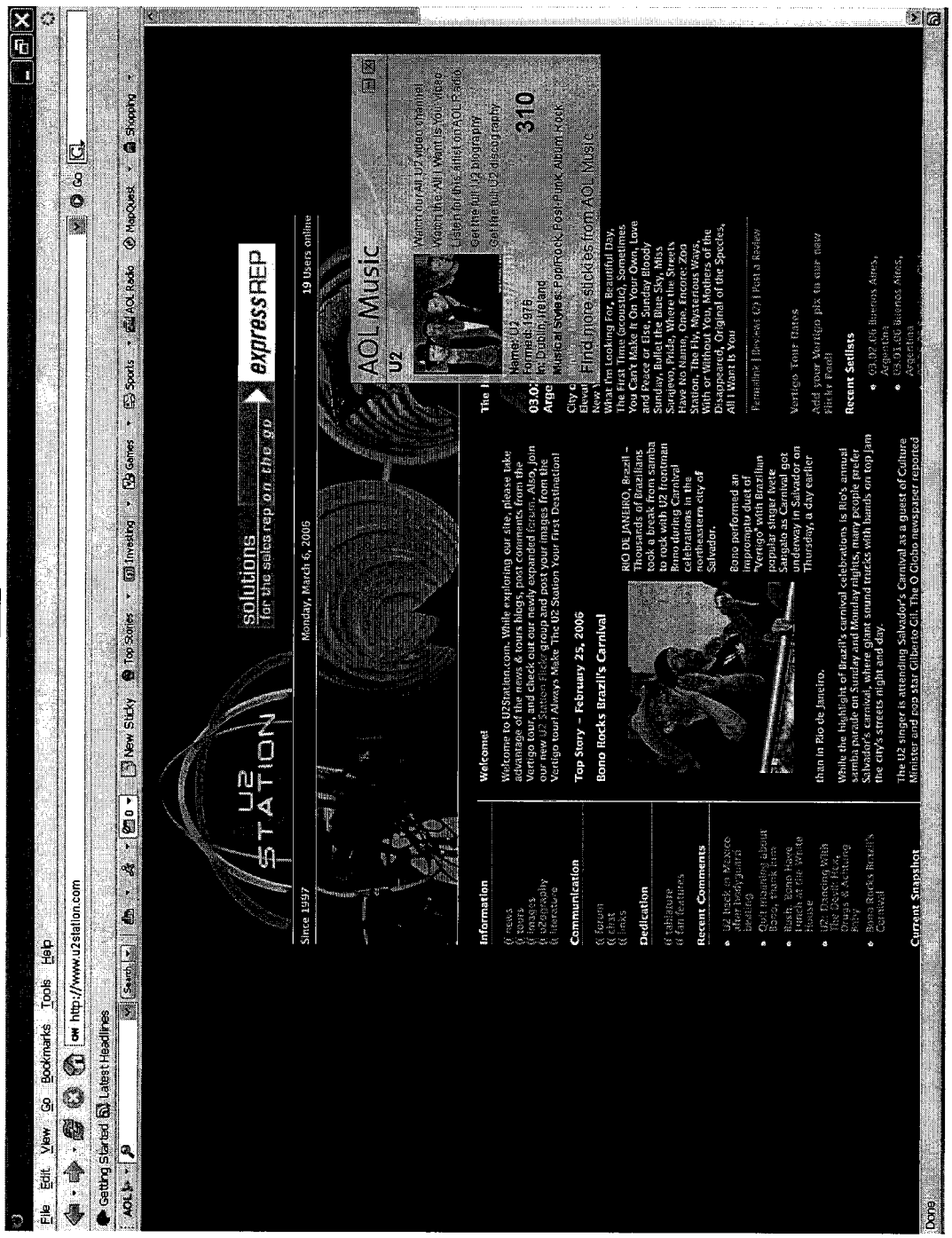
FIGS. 3A and 3B illustrate exemplary graphical user interfaces including Internet content markings created by a digital entity.

Referring to FIG. 3A, a GUI 300 includes a website and an Internet content marking 310 created by a digital entity. In the GUI 300, a user has opted-in to view stickies by the digital entity, "AOL Music." The digital entity automatically presents stickies 310 relative to the content of websites associated with the entity. Thus, if the content of a website changes, a sticky associated with the website may include the new content automatically. In GUI 300, the sticky 310 is directed towards the band U2. The sticky includes interactive content in the body, including a photo and links to media. Alternatively, the sticky may play the media inside the body. The sticky 310 is presented to augment content shown on a webpage. In one implementation, keywords used in text on a website may be used to automatically determine the content of a sticky. For example, a news website includes a sticky placed over articles with links to further information concerning the text of the article.

The digital entity may track the user's interaction with stickies and use tracked information to determine when or how to present stickies. For example, if a user is tracked to often close stickies, the stickies may be presented in less obtrusive positions (e.g., on the sides of websites) or may be presented less often. Further, if a user often interacts with stickies, the digital entity may present a greater number of stickies.

Figure 3B:
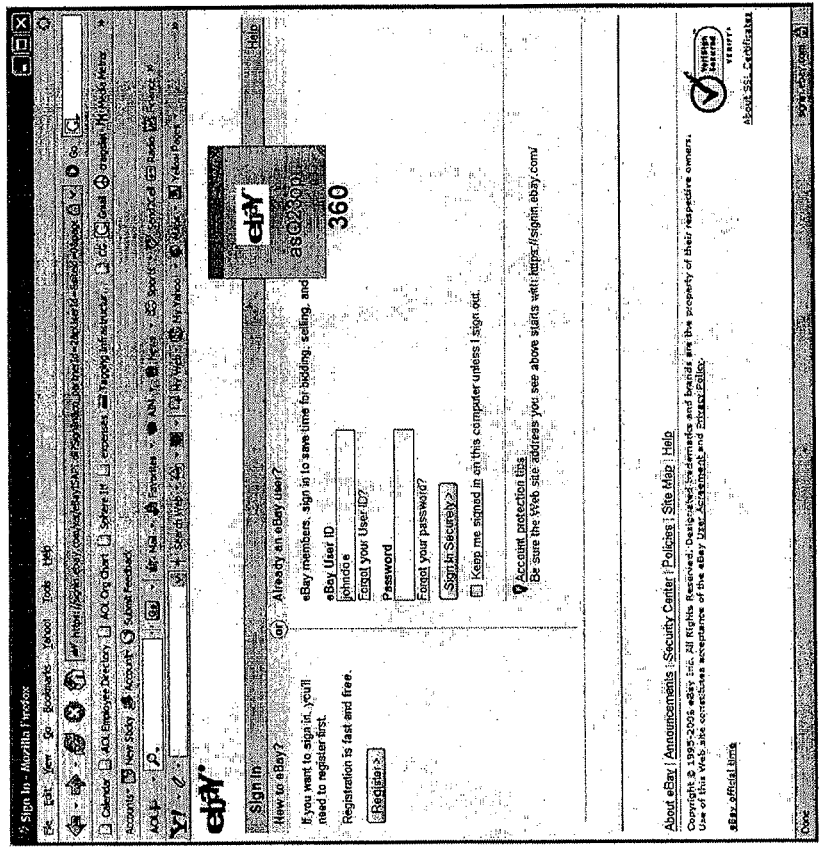

Referring to FIG. 3B, a GUI 350 includes a website and an Internet content marking 360 created by a digital entity. In the GUI 350, a user has opted-in to view security stickies. Security stickies are produced by a trusted source to certify authenticity of a website, or to store information directed to a website such as a password. In some cases, emails may contain links to websites to that look legitimate in order to "phish" or trick users into divulging content. For example, emails have targeted Ebay users by directing the user to a website that looks nearly identical to Ebay's actual website, and recording any password entered by the user. A host that controls the presentation of stickies can detect legitimate websites, and present a sticky specifying the legitimacy of the website. The security sticky may optionally include the password or login information for the website.

In the GUI 350, the user has navigated to a login website for Ebay. The host has presented a security sticky 360 that enables the user to determine that he or she has legitimately navigated to Ebay. The security sticky displays the user's password for the website.

In one implementation, a user may opt-in to a security sticky list which automatically presents stickies for websites that have been determined to have a security risk. The automatically generated sticky may include information detailing the determined security risk to the user. For example, the host may determine that a website is associated with a large number of recent computer virus infections. If a user who has opted-in to security stickies navigates to the website, a security sticky will be presented with information concerning the possible security risk posed by the website to the user. In this manner, users may be protected from security risks of which they are not originally aware.

The previous descriptions are example implementations of GUIs for distributing Internet content markings from digital entities. Other implementations may be organized differently and may include different features. For example, in one implementation, the stickies may include an opt-out icon which is interactive such that the icon enables the user to opt-out of either the currently shown sticky, future stickies on that particular website, or stickies from that particular author or digital entity.

Figure 4:
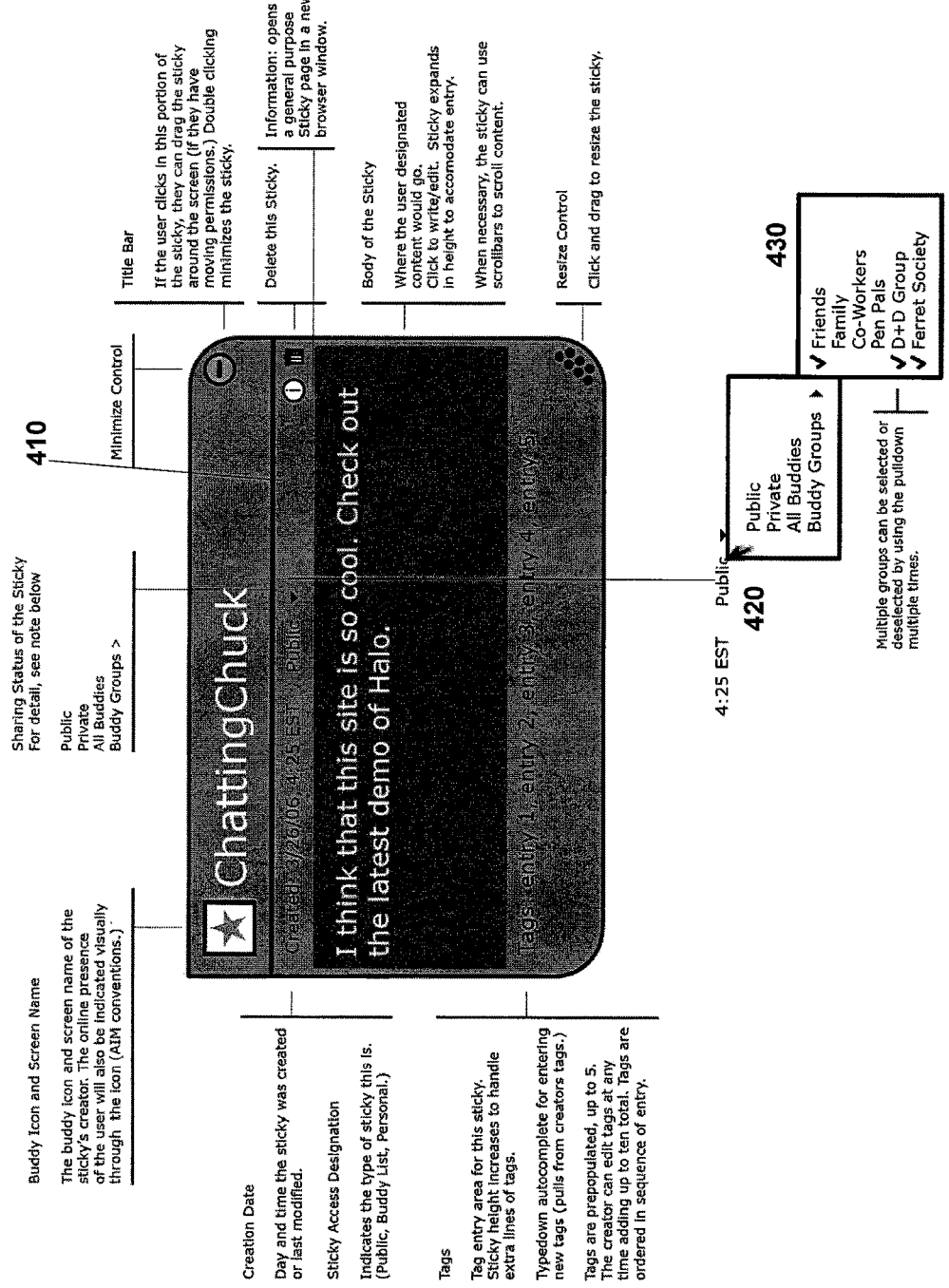
FIG. 4 illustrates an exemplary graphical user interface including sharing options for Internet content marking creation.

Referring to FIG. 4, a GUI 400 for Internet content creation includes sharing options 410. In the GUI 400, an author may edit or create a sticky and its components. The GUI 400 includes instruction text that directs the author to edit and or understand the features and components of the sticky, according to one implementation.

In the GUI 400, the user may select sharing options 410 to determine what groups of users may opt-in to view the sticky. According to one implementation, the sharing options are public, private, all buddies, or buddy groups. The "public" option enables all users to opt-in to view the sticky. The "private" option enables only the user to opt-in. The "all buddies" option enables all users on an author's list of associated users (e.g., a "buddy list") to opt-in. The "Buddy Group" option enables the author to select from different groups of the users on the author's list of associated users. The different groups may be organized based on a buddy list organization or based on a manual organization by the author.

The previous description is an example implementation of a GUI for Internet content marking creation. Other implementations may be organized differently and may include different features. For example, a sharing option, "invite others," may be included which enables users who have opted-in to invite additional users to opt-in, even when those additional users were not previously enabled to do so. Also, a "private list" option may be included which enables the user to manually enter a list of one or more users that may opt-in.

Referring to FIG. 5A, a GUI 500 for editing Internet content marking settings includes a default sharing option 505, a display group option 510, a display maximum option 515, a sticky refresh option 520, an auto-tag option 525, and appearance options for presented 530 and viewed 535 stickies. The GUI 500 may be used to set options for creating or viewing stickies.

The default sharing option 505 enables an authoring user to select the default sharing setting for stickies created by the authoring user. The display group option 510 enables the user to select which stickies to view. Although only public, private, and buddy selection options are shown for options 505 and 510, other implementations may include other selection options, such as a "same as" option which enables the user to select another presented sticky to mimic selected sharing options. Also, other implementations may include an option to display stickies by a digital entity as described in FIG. 3A. The display maximum option 515 enables a user to determine the maximum number of stickies to present with a webpage.

The sticky refresh option 520 enables a user to set when to check a website for stickies. The auto-tag option 525 enables a user to set whether the tags for a sticky are automatically suggested when creating or editing a sticky. The suggestion may be based on the content of a sticky, content of related websites, or the sharing setting for the sticky. Appearance options for presented and viewed stickies 530 and 535 enable a user to select from various cosmetic appearance options, that may, for example, determine the background of viewed or created stickies.

Figure 5B:
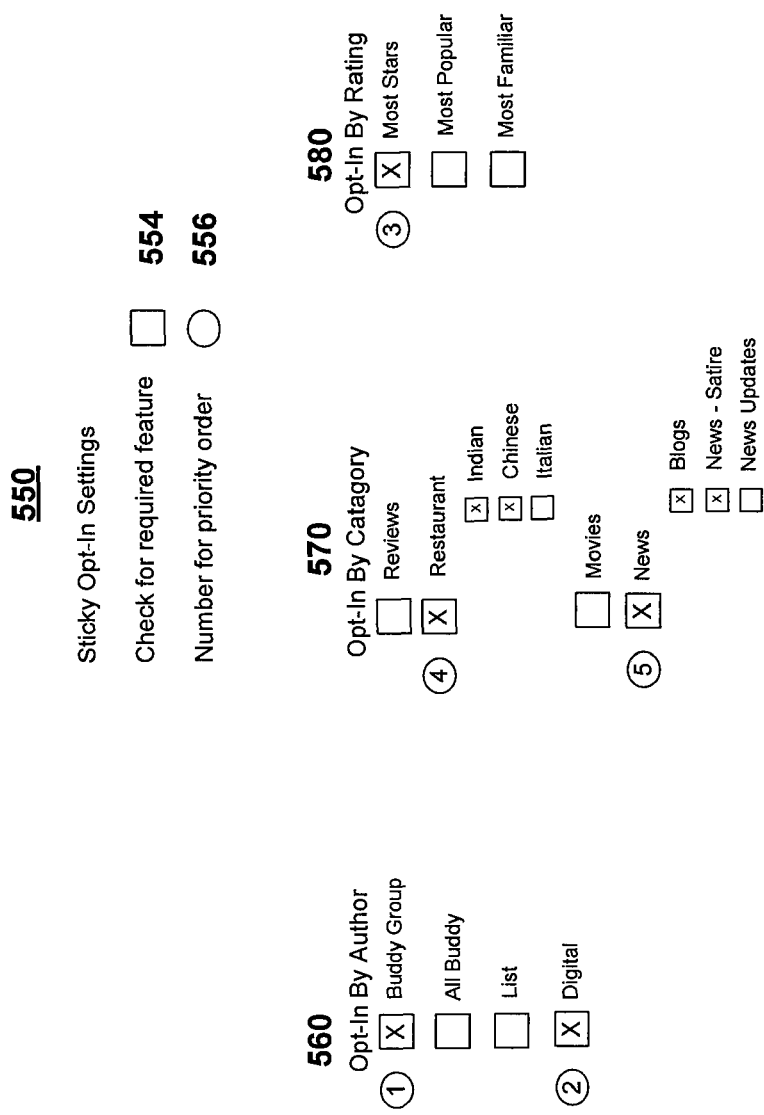

More specifically, FIG. 5B shows a GUI 550 for selecting preferences for opting-in to view available stickies. Options within the GUI 550 may be presented in addition to or as an alternative to manually opting-in to stickies generally or stickies by an author. In the GUI 550, a user may select required features 554 for opt-in and a priority of features 556. The user may also select among an opt-in by author option 560, an opt-in by category option 570, and an opt-in by rating option 580. Multiple options may be selected, and stickies may be presented, depending on the implementation, if they meet any or multiple options selected. In one implementation, some options are used to determine if stickies are presented at all, and other options are used to determine sticky priority.

As a user may not view all opted-in stickies due to the display maximum option 515, automatic selection of preferred stickies is enabled by selection of required features 554 for opt-in and the priority features 556. If a required feature 554 is selected, a sticky which includes the feature, may, dependent on priority, be displayed with a webpage. In particular, if the number of available opted-in stickies for a given webpage is less than the maximum that may be displayed, all the available opted-in stickies are displayed. If the number of available opted-in stickies is greater, the priority of features 556 may be used to determine which stickies are to be displayed. In one implementation, a user may specify the priority of features 556 by numbering required features 554 by the order in which the stickies with the required features 554 are to be displayed until the maximum number of stickies are displayed.

The opt-in by author option 560 enables a user to select the authors whose stickies are automatically presented or considered for presentation. The user may select to opt-in by authors in buddy groups, authors that are buddies, authors that are manually listed, or authors that are digital entities.

The opt-in by category option 570 enables a user to select categories of content for which associated stickies are to be presented or considered for presentation. Stickies may be considered to be in a category based on the occurrence of terms in the sticky or Internet content associated with the sticky, or by the content of the sticky body. The categories may include any number of sub-categories specific to a category. The categories displayed in GUI 550 are exemplary, and other or different categories may be included.

The opt-in by rating option 580 enables a user to select ratings to determine whether stickies are presented or considered for presentation. Sub-categories of the opt-in by ratings options 580 enable selection by the most stars (e.g., highest rated), by popularity, such as the number of ratings, or by familiarity, such as by ratings rated by buddies.

The previous descriptions are example implementations of GUIs for editing Internet content markings. Other implementations may be organized differently and may include different features. For example, a "Display Order" option may be included that enables a user to organize the order in which stickies appear by sorting or listing stickies. For example, if the user has selected 10 as the display maximum option 515 and visits a website with 15 stickies to which the user has opt-ed in, the display order option may be used to determine which 10 of the 15 stickies are presented.

Figure 6:
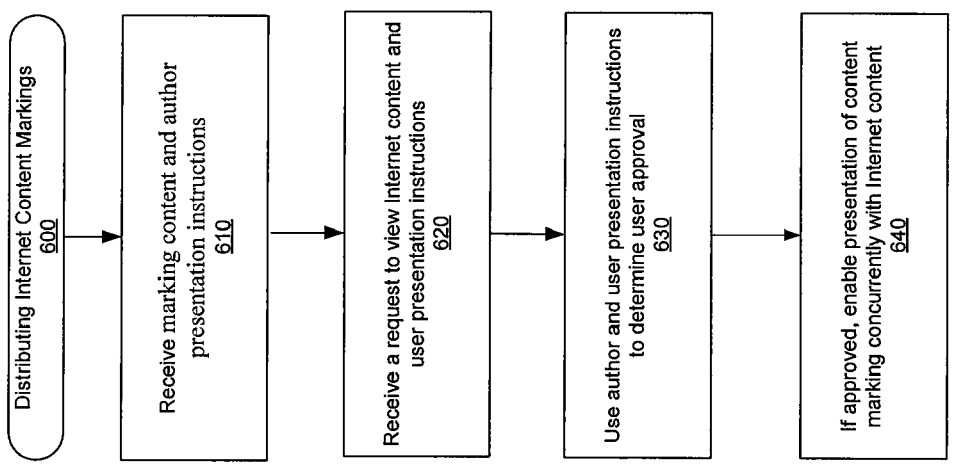
FIGS. 6, 7, and 8 illustrate exemplary flow charts of processes to distribute Internet content markings.

Referring to FIG. 6, a process 600 may be used to distribute Internet marking content. The process 600 be used to present the GUI of FIG. 1 or 2. The process 600 may begin when marking content and author presentation instructions are received (610). Receiving marking content may include receiving text or media to be displayed in a body, or may include a URL with which a program will automatically access text to present content markings (e.g., a blog website). The author presentation instructions determine which user may opt-in and may be a list of users, a command to accept all users on a list (e.g., "buddy list"), or may be a command to allow all users to opt-in.

A request to view Internet content and user presentation instructions are received (620). Receiving a request to view Internet content markings may include a request to view a URL or activation of a program. The user presentation instructions determine which stickies to present. The presentation instructions may be a list of authors, a command to opt-in to all authors on a list (e.g., "buddy list"), or a command to opt-in based on a website, such as, for example, a command to opt-in to available stickies on www.aol.com.

Author and user presentation instructions are used to determine approval of the user to view the Internet content marking (630). If approved, the Internet content marking is presented to the user along with the requested Internet content (640).

The previous description is an example implementation of a process to distribute Internet marking content. Other implementations may be organized differently and may include different steps. For example, in some implementations, the user may be presented with an option to accept or reject stickies when visiting a webpage.

Figure 7:
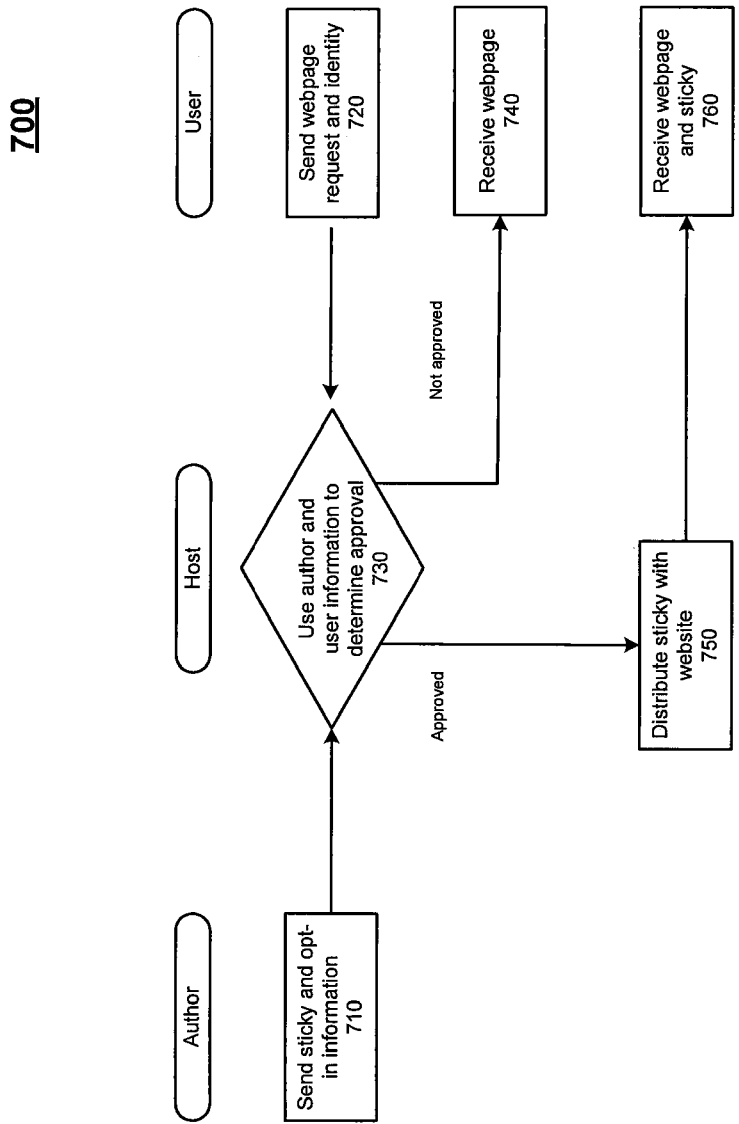

Referring to FIG. 7, a process 700 may be used to distribute Internet marking content. The process 700 may be used to present the GUI of FIG. 1 or FIG. 2.

The process 700 begins when an author sends sticky and opt-in information to a host (710). Sticky information includes the text and content to be displayed in the body of the sticky, as well as a website or websites with which the sticky is to be associated. The opt-in information includes a user, a list of users, or a set of instructions specifying the users eligible to opt-in.

A user sends a request to view the website associated with the sticky and the user's identity information to the host (720). Alternatively, the user may send a request to view the website associated with the sticky and the user's identity information to multiple entities as described with respect to FIG. 8. The request includes a uniform resource locator (URL) along with the user's identity (e.g., an instant messaging screen-name or IP address). The host uses the author and user information to determine if the user is approved to view the sticky (730). The host may access website content and sticky information locally or from a third party and may compare the user's identity to an opt-in list sent by the author.

If the user is not approved, the host sends the website content without the sticky to the user (740). If the user is approved, the host enables presentation of the sticky concurrently with the website content (750). The user receives the website and sticky content configured to be displayed such that the sticky is superimposed over the website (760).

The previous description is an example implementation of a process to distribute Internet marking content. Other implementations may be organized differently and may include different steps. For example, in some implementations, the host determines approval for stickies from multiple authors with each visit to a website.

Figure 8:
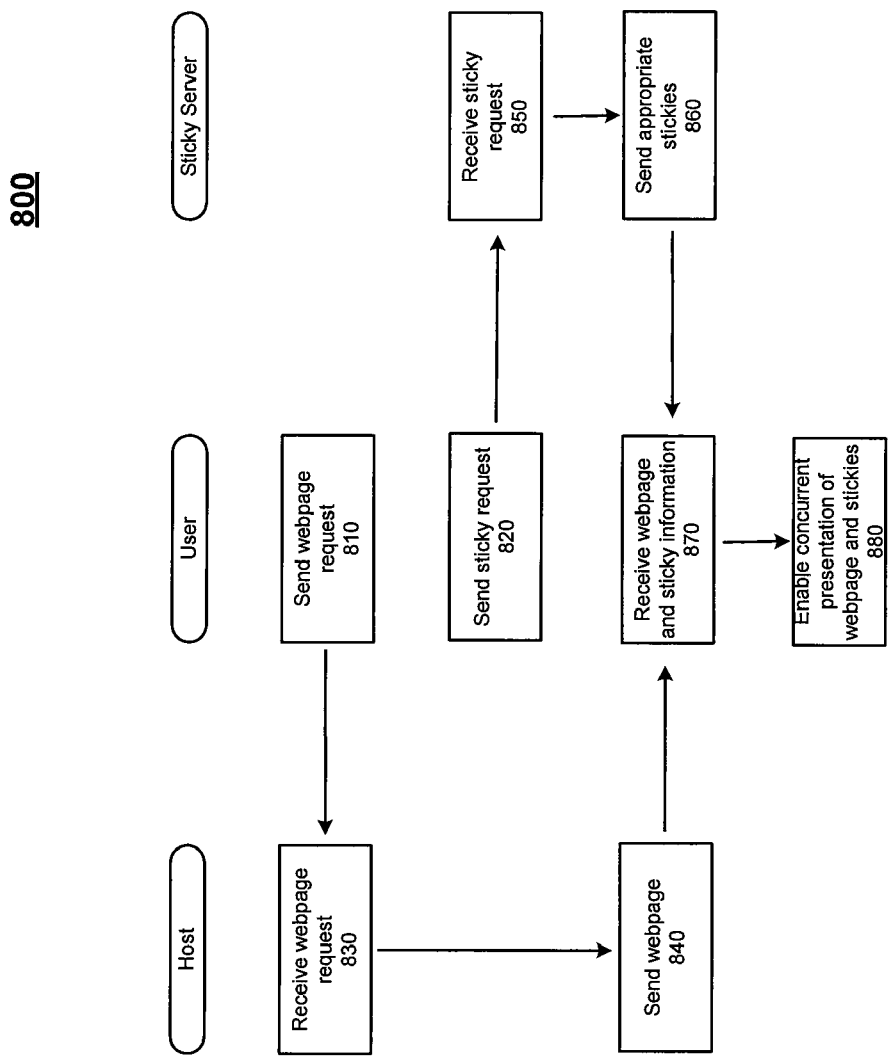

Referring to FIG. 8, a distributed process 800 may be used to receive Internet marking content. In the distributed process 800, the user may send a request to view a website to a host, while concurrently sending a request for stickies including identity and requested website information to a second entity configured to provide appropriate stickies. The user may separately receive the webpage and associated stickies, which are then concurrently displayed.

In particular, the distributed process 800 begins when the user sends a request to receive a webpage to a host (810). In various implementations, the webpage request may be a conventional request in that it may not include any information related to marking content and the host may be an Internet service provider (ISP). The user sends a request to receive appropriate stickies to a sticky server (820). User identity and requested webpage information may be included in the request for appropriate stickies. The sticky server may be a second server within an ISP or a server independent of the ISP. In one implementation, the sticky server is a third party outside of the ISP and may be configured to receive requests for stickies from multiple users associated with multiple ISPs. Specifically, a sticky may be requested from the user by a software program independent of an ISP program such that the sticky program is functional regardless of the ISP used to connect to the Internet.

The host receives the request (830) and sends the webpage to the user (840). The sticky server receives the request to receive appropriate stickies (850). Using identity information received in the request, the sticky server determines which stickies are appropriate for the combination of the user and webpage requested. The sticky server may include or have access to a database of stickies and associated presentation instructions. Appropriate sticky information is sent by the sticky server to the user (860).

The user receives the webpage and sticky information (870) and enables concurrent presentation of the webpage and stickies (880). At the user, one or more stickies may be displayed superimposed over the webpage.

The previous description is an example implementation of a distributed process to receive Internet marking content. Other implementations may be organized differently and may include different steps. For example, the distributed process may begin when the user sends a request to receive appropriate stickies to a sticky server. Also, the distributed process may take place within a host or ISP. In particular, the using author and user information to determine approval (730) as discussed with respect to FIG. 7 may include using the distributed process with the host server replacing the user.

What is claimed is:

1. A computer-implemented system for distributing marking content, the system comprising:
   a memory device that stores instructions; and
   at least one processor that executes the instructions to perform a series of steps, including:
      receiving, at a host server, an opt-in instruction set from an authoring entity, wherein the opt-in instruction set includes instructions for displaying marking content to viewers of a website;
      receiving, at the host server, a request from a first user to receive content of the website;
      transmitting, from the host server to the server of a digital entity, a request to view the website and marking content associated with the website;
      in response to the server of the digital entity determining that the website does not pose a security risk to the first user,
      receiving, at the host server from the server of the digital entity, the content of the website and a user authentication request including user opt-in preferences of the user;
      receiving, at the host server, marking content automatically selected using the user opt-in preferences, the marking content including verification information of the authenticity of the website and a security note associated with at least one of the website and the user;
      displaying the content of the website including the user authentication request in a first graphical window of the website; and
      displaying the selected marking content including the verification information in a second graphical window of the website, the separate second graphical window further configured to display i) the security note, ii) information regarding the website security risk determination, and iii) the verification information verifying the authenticity of the website.

2. The computer-implemented system of claim 1, wherein the one or more marking content is configured with presentation instructions.

3. The computer-implemented system of claim 2, wherein the presentation instructions include instructions for approving the viewing of the one or more marking content by one or more users.

4. The computer-implemented system of claim 1, wherein the one or more marking content has one or more associated tags.

5. The computer-implemented system of claim 1, wherein the one or more marking content has one or more associated keywords.

6. The computer-implemented system of claim 1, wherein the security note includes an author identifier.

7. The computer-implemented system of claim 1, wherein the security note includes an online presence information for the author identifier.

8. The computer-implemented system of claim 1, wherein the security note includes a body comprising at least one of text, media, or interactive content.

9. A non-transitory computer-readable medium including a set or instructions for distributing marking content, the instructions, when executed by a processor, performing a series of operations, including:
   receiving, at a host server, an opt-in instruction set from an authoring entity, wherein the opt-in instruction set includes instructions for displaying marking content to viewers of a website;
   receiving, at the host server, a request from a first user to receive content of the website;
   transmitting, from the host server to the server of a digital entity, a request to view the website and marking content associated with the website;
   in response to the server of the digital entity determining that the website does not pose a security risk to the first user,
   receiving, at the host server from the server of the digital entity, the content of the website and a user authentication request including user opt-in preferences of the user;
   receiving, at the host server, marking content automatically selected using the user opt-in preferences, the marking content including verification information of the authenticity of the website and a security note associated with at least one of the website and the user;
   displaying the content of the website including the user authentication request in a first graphical window of the website; and
   displaying the selected marking content including the verification information in a second graphical window of the website, the separate second graphical window further configured to display i) the security note, ii) information regarding the website security risk determination, and iii) the verification information verifying the authenticity of the website.

10. The computer-readable medium of claim 9, wherein the one or more marking content is configured with presentation instructions.

11. The computer-readable medium of claim 10, wherein the presentation instructions include instructions for approving the viewing of the one or more marking content by one or more users.

12. The computer-readable medium of claim 9, wherein the one or more marking content has one or more associated tags.

13. The computer-readable medium of claim 9, wherein the one or more marking content has one or more associated keywords.

14. The computer-readable medium of claim 9, wherein the security note includes an author identifier.

15. The computer-readable medium of claim 9, wherein the security note includes an online presence information for the author identifier.

16. The computer-readable medium of claim 9, wherein the security note includes a body comprising at least one of text, media, or interactive content.

17. A computer-implemented method for distributing marking content, comprising:

receiving, at a host server, an opt-in instruction set from an authoring entity, wherein the opt-in instruction set includes instructions for displaying marking content to viewers of a website;

receiving, at the host server, a request from a first user to receive content of the website;

transmitting, from the host server to the server of a digital entity, a request to view the website and marking content associated with the website;

in response to the server of the digital entity determining that the website does not pose a security risk to the first user, receiving, at the host server from the server of the digital entity, the content of the website and a user authentication request including user opt-in preferences of the user;

receiving, at the host server, marking content automatically selected using user opt-in preferences, the marking content including verification information of the authenticity of the website and a security note associated with at least one of the website and the user;

displaying the content of the website including the user authentication request in a first graphical window of the website; and displaying the selected marking content, including the verification information in a second graphical window of the website, the separate second graphical window further configured to display i) the security note, ii) information regarding the website security risk determination, and iii) the verification information verifying the authenticity of the website.

* * * * *